Jan. 18, 1938.　　A. C. VOBACH ET AL　　2,105,851
LUBRICANT DEMETALLIZER
Filed Sept. 22, 1936
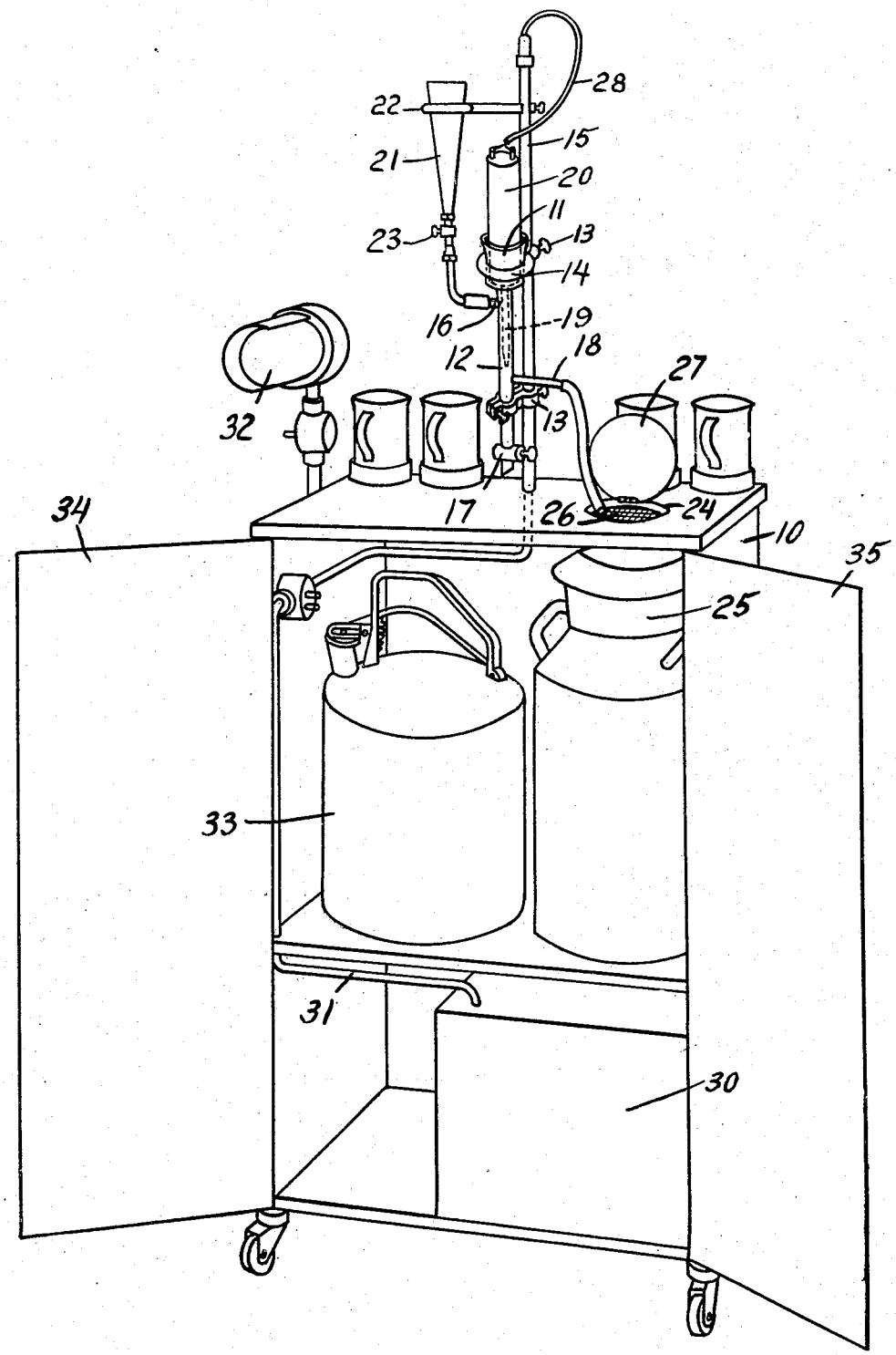
INVENTORS
Arnold C. Vobach
Matthew Fairlie
BY
Pennie, Davis, Marvin and Edmonds
ATTORNEYS Patented Jan. 18, 1938

2,105,851

UNITED STATES PATENT OFFICE 2,105,851

LUBRICANT DEMETALLIZER

Arnold C. Vobach, Whiting, and Matthew Fairlie, Hammond, Ind., assignors to Sinclair Refining Company, New York, N. Y., a corporation of Maine Application September 22, 1936, Serial No. 101,904

5 Claims. (Cl. 73—51)

This invention relates to the art of lubrication in machine operation and has for an object the provision of an improved apparatus for determining the quantities and natures of solid contaminants in lubricants. More particularly, the invention contemplates the provision of an improved method and apparatus for ascertaining the extent or degree of contamination of a lubricant after a period of use.

Oils and similar substances employed for lubricating the moving parts of various machines gradually become contaminated with metallic and non-metallic solid substances resulting from contact of the various elements of the machines and from other causes. The metallic contaminants act as abrasives and cause damage to the machine parts, the amount of damage depending upon the quantities of contaminants present and upon the sizes and shapes of the particles. Non-metallic contaminants may act as abrasives and, also, may serve to cause thickening or gumming of the lubricants with resulting loss in machine efficiency. In order to avoid damage to machines and reduce efficiency losses, it is necessary to change lubricants periodically, substituting fresh, uncontaminated lubricants for contaminated lubricants.

The frequency of required change of lubricant depends, among other things, upon the quality of the original lubricant, the weight, relative speed and hardness of the rubbing or contacting parts of the machine and the conditions, with respect to loading for example, under which the machine is used. In machines of any particular type it is difficult or impossible to predict with certainty the period of time during which a lubricant will remain sufficiently uncontaminated to permit efficient and non-abrasive operation.

Consequently, it is customary either to establish arbitrary and supposedly safe periods of use of lubricants in machines having certain general characteristics or to test the lubricants for contaminants periodically. The use of lubricants for arbitrary periods of time is unsatisfactory because machines having the same or similar general characteristics may have considerably different characteristics with respect to contamination of lubricants because of unavoidable lack of uniformity in construction and operation and because of different conditions of use and operation. In different machines of a particular type, the period during which a lubricant retains its effectiveness may be considerably longer or considerably shorter than the arbitrary period established, and, therefore, the use of a lubricant for an arbitrary period may result either in waste of lubricant or damage to the machine through abrasion.

The harmful and wasteful consequences of employing lubricants for arbitrary periods of time are quite generally recognized by those skilled in the art of machine operation, but to the layman such, for example, as the average automobile owner or operator, lubrication is a matter of only remote significance. The period of effectiveness of a lubricant in any particular machine can be determined properly only by periodic tests of the lubricant for contaminants so that it may be replaced after it has been properly utilized but before it has become so contaminated as to reduce the efficiency of or cause damage to the machine. This fact is appreciated by those skilled in the art of machine operation, but testing has not been widely adopted because testing methods and apparatus proposed heretofore are inaccurate or expensive, or the real significance of the test results is not apparent to the layman. For example, a method proposed heretofore involves filtration of the lubricant through porous paper, after dilution with a suitable solvent if necessary. The metal particles appear on the paper as a residue in the form of an impalpable powder. This fine powder is innocent looking, and, even when rubbed between the thumb and finger, it fails to impress the layman with its abrasive possibilities. The sharp, jagged edges of the particles forming the powder which cause the particles to be such effective abrasive elements in machines make no impression on the soft but tough skin of the thumb and finger. This method of testing is unsatisfactory also because it does not permit a ready determination of the exact or the approximate proportion of contaminants in the lubricant.

The present invention provides a simple and effective apparatus for demonstrating the condition of a lubricant with respect to contaminants and for illustrating the probable effects of the contaminants on machine parts.

In accordance with our invention, a lubricant to be tested is subjected to the influence of a magnetic field for the purpose of separating and collecting the particles of magnetic metal such as iron and steel contained therein. Under the influence of a magnetic field the magnetic metal particles are so oriented and agglomerated as to impress the lubricant user whether layman or skilled, with their true possibilities for causing damage. The invention also provides for the separation and separate collection of the magnetic metal particles and the particles of non-magnetic or non-metallic solid materials contained in the lubricant. The lubricant may be subjected to the influence of a magnetic field in any suitable manner. Preferably, the lubricant is passed in contact with the surface of a magnet to which the metal particles may adhere. Any suitable type of magnet, permanent or electromagnet, may be employed. The apparatus of the invention comprises a magnet so disposed that the lubricant to be tested may be brought readily within the influence of its field. A preferred form of apparatus comprises a conduit, a magnetized element disposed within the conduit and means for flowing a lubricant to be tested in contact with the magnetized element.

The invention further contemplates the provision of a complete self-contained testing apparatus which may be either stationary or portable. A preferred form of apparatus of this type may comprise a cabinet for supporting the testing unit proper and provided with one or more compartments for the reception of fluid receptacles or containers and other elements which may be employed in the complete apparatus. The cabinet is preferably provided with an opening in its top wall communicating with a fluid receptacle within the cabinet for receiving the lubricant after treatment in the testing unit. The testing unit preferably comprises a transparent conduit having an inlet for introducing lubricant to be tested into the conduit and an outlet for withdrawing the lubricant from the conduit. A magnetized element is disposed within the conduit in the path of travel of lubricant from the inlet to the outlet. The inlet is connected with a funnel or other suitable means for introducing lubricant to be tested into the conduit, and the outlet communicates with the opening in the top wall of the cabinet and with the fluid receptacle within the cabinet.

Any suitable type of magnetized element may be employed. Preferably an electromagnet having a portion of its core projecting in the form of a blade is employed. The electro-magnet preferably is energized by current from a battery within the cabinet, lead wires from the battery passing through an opening in the top wall of the cabinet to the electro-magnet.

The transparent conduit of the testing unit preferably is the stem portion of a vertically supported funnel-shaped piece of glass apparatus having a bowl portion and a stem portion, the bowl portion of which serves as a supporting pocket or recess for the electro-magnet, the projecting blade portion of the core extending downwardly into the stem portion. The stem portion is provided with a stop cock adjacent its discharge end, an inlet adjacent the bowl portion and an outlet between the stop cock and the inlet but spaced from the stop cock to provide a well for collecting non-magnetic material contained in lubricant tested. The inlet and the outlet preferably are disposed on opposite sides of the stem portion to provide for the flow of lubricant from one side to the other in contact with the magnetized blade, and the outlet preferably is smaller than the inlet to permit the lubricant level to build up within the stem portion.

The invention will be better understood from a consideration of the following description in conjunction with the accompanying drawing in which is illustrated a complete self-contained testing apparatus embodying the invention.

The apparatus shown in the drawing comprises a cabinet 10 which forms a support for the testing apparatus proper comprising a funnel shaped transparent glass element having a bowl portion 11 and a stem portion 12 and supported in an upright (substantially vertical) position, with the bowl 11 at the higher elevation, by means of a clamp 13 and a ring 14 movably mounted on an upright metal tube 15. The stem 12 is provided with an inlet 16 adjacent the bowl 11, a stop cock 17 adjacent its lower or discharge end and an outlet 18 between the inlet and the stop cock and spaced above the stop cock. The inlet and the outlet are disposed on opposite sides of the stem.

An electro-magnet 20 having a cylindrical body and having a portion of its soft iron core formed in the shape of a blade 19 and projecting from the body is disposed within and supported by the bowl 11. The blade 19 projects downwardly to a point below the inlet 16 and it is so disposed with respect to the inlet that liquid entering the stem is projected onto the blade and flows downwardly thereover in the form of a thin film. The electromagnet may be removed from the bowl 11 at will to permit inspection of the blade. A funnel 21, held in position by means of a ring 22 movably supported on the vertical tube 15, is connected to the inlet 16 by means of a flexible conduit. A valve 23 is provided for controlling the flow of fluid from the funnel 21 to the inlet 16.

The outlet 18 is connected by means of a flexible tube with an opening 24, provided with a screen 26 and a hinged cover 27, in the top wall of the cabinet 10 which communicates with a fluid receptacle 25 within the cabinet. The electromagnet 20 is connected by lead wires 28 extending from suitable binding posts thereon to the terminals of a battery 30 within the cabinet. The lead wires 26 pass through the tube 15, an opening (not shown) in the top wall of the cabinet in registration with the opening in the tube and the conduit 31 within the cabinet.

Auxiliary equipment includes metal cups and suitable holders mounted on top of the cabinet, an electric lamp 32 mounted in vapor-proof fittings and a container 33 for solvent-diluent. The cabinet preferably is formed of sheet metal and provided with sheet metal doors 34 and 35 for concealing its interior. The cabinet is provided with small wheels or casters to facilitate its movement.

The apparatus of the invention may comprise elements of any suitable sizes and configurations. A funnel-shaped glass conduit employed satisfactorily had a cylindrical stem of uniform cross-section from the bowl to the stop cock of 18 mm. internal diameter, an inlet of 8 mm. internal diameter and an outlet of 6 mm. internal diameter. The bowl was of suitable size to receive an end portion of an electro-magnet having a cylindrical body 1.75 inches in diameter. The electro-magnet had a soft iron core with a cylindrical main portion (covered by the windings) 0.625 of an inch in diameter and 6.5 inches in length and a blade portion, rectangular in cross section, 0.125 of an inch thick, 0.5 of an inch wide and 4.0 inches long. The winding contained 1008 turns of #18 B. & S. enameled magnet wire in 7 layers and was sheathed in 20 gauge brass separated from the wire by a sealing compound. The electro-magnet was energized by current from a 15 plate, 6 volt storage battery.

In employing the apparatus shown in the drawing for testing purposes, a small quantity (say, two fluid ounces) of a lubricant suspected of containing metal particles such, for example, as automobile differential or transmission lubricant is mixed in one of the cups provided with four to five times its volume of a suitable solvent-diluent such as gasoline, naphtha or kerosene from the container 33 in the cabinet. The solvent-diluent is added to the lubricant in order to reduce its viscosity sufficiently to permit it to flow through the apparatus and, also to permit ready travel of the metal particles through the lubricant to the magnetized blade 19.

The mixture of lubricant and solvent-diluent is placed in the funnel 21. With the magnetized blade in place in the stem 12, the valve 23 is opened to permit the mixture to flow into the stem 12 and over the face of the magnetized blade. As the mixture flows through the stem, magnetic metal particles are attracted to the magnetized blade and non-magnetic solids settle in the well between the outlet 18 and the stop cock 17. The liquid portion of the mixture flows through the outlet 18 to the fluid receptacle 25 within the cabinet. After the quantity of non-magnetic solids in the well has been observed, this accumulation may be drained from the well by opening the stop cock 17. The stop cock then preferably is closed and fresh solvent-diluent (preferably gasoline or light naphtha) is introduced through the funnel 21 until substantially all of the soluble material has been removed. This permits easy inspection of the magnetized blade for metal particles, either before or after removal of the blade from the stem.

Under the magnetic influence, the particles agglomerate into large particle groups of jagged appearance and an effect of magnification is produced. The particles, being agglomerated and oriented to display their sharp and jagged edges, impress the observer with their potency as abrasive agents and impress the lubricant user with a true picture of the possible injurious results of continuing the use of contaminated lubricant.

The test may be conducted to produce substantially quantitative as well as qualitative results. For example, employing a magnetized blade of certain dimensions in the treatment of lubricant standards containing various amounts of harmful magnetic metal contaminants, some containing amounts known to be harmless and others containing amounts known to be harmful, standards for comparison in future tests, based on degree and depth of coverage of the blade particles may be obtained. In this manner, approval or condemnation of a tested lubricant may be justified by data scientifically obtained. Similar standards of comparison may be obtained for non-metallic contaminants by calibrating the well above the stop cock 17 and making observations of the sediment and slow-settling solids in the treatment of lubricant standards.

The apparatus of the invention permits ready and accurate determination of the condition of a lubricant, indicating definitely whether continued use would be safe or unsafe. Thus, on the one hand, the invention provides for the elimination of the wasteful practice of discarding lubricant prematurely, and, on the other hand, for the prevention of damages to machines through continued use of unsafe lubricants.

We claim:

1. Apparatus of the class described, comprising an upright glass tube, an inlet for introducing fluid to be tested into the upper portion of the tube, an outlet for withdrawing fluid from the lower portion of the tube, a magnetized element extending downwardly into the tube in the path of travel of fluid from the inlet to the outlet for collecting metal particles contained in fluid passing through the tube, and a well communicating with the interior of the tube and disposed below the outlet for collecting non-metallic solids contained in fluid passing through the conduit.

2. Apparatus of the class described, comprising a funnel shaped element, having a bowl and a stem, formed of transparent material provided with a stop cock adjacent the discharge end of the stem and having a fluid inlet disposed adjacent the bowl and a fluid outlet disposed between the inlet and the stop cock at a point spaced from the stop cock to provide a well for collecting non-metallic solids contained in fluid passing through the stem, a magnetized element supported in the bowl and extending into the stem to a point between the inlet and outlet for collecting metal particles contained in fluid passing through the stem, means for supporting the funnel shaped element in an upright position with the bowl at the higher elevation, and means for introducing fluid to be tested into the stem through the inlet.

3. Apparatus of the class described, comprising a funnel shaped element, having a bowl and a stem, formed of transparent material provided with a stop cock adjacent the discharge end of the stem and having a fluid inlet communicating with the interior of the stem at a point adjacent the bowl and a fluid outlet communicating with the interior of the stem at a point between the inlet and the stop cock and spaced from the stop cock to provide a well for collecting non-metallic solids contained in fluid passing through the stem, an electro-magnet mounted in the bowl with a portion of its core extending into the stem to a point between the inlet and the outlet for collecting metal particles contained in fluid passing through the stem, means for supporting the funnel shaped element in an upright position with the bowl at the higher elevation, means for energizing the electro-magnet, and means for introducing fluid to be tested into the stem through the inlet.

4. Apparatus of the class described, comprising a cabinet having an opening extending through its top wall, a fluid receptacle disposed within the cabinet below the opening in the top wall, a testing unit mounted on the cabinet and comprising a transparent conduit, an inlet for introducing fluid to be tested into the conduit, an outlet for withdrawing fluid from the conduit, a magnetized element disposed within the conduit in the path of travel of fluid from the inlet to the outlet for collecting metal particles contained in fluid passing through the conduit, means for introducing fluid to be tested into the conduit through the inlet, and means connecting the outlet with the opening in the top wall of the cabinet and with the fluid receptacle within the cabinet.

5. Apparatus of the class described, comprising a cabinet having an opening extending through its top wall, a fluid receptacle disposed within the cabinet below the opening in the top wall, a testing unit mounted on the cabinet and comprising a funnel shaped element, having a bowl and a stem, formed of transparent material provided with a stop cock adjacent the discharge end of the stem and having a fluid inlet disposed adjacent the bowl and a fluid outlet disposed between the inlet and the stop cock at a point spaced from the stop cock to provide a well for collecting non-metallic solids contained in fluid passing through the stem, a magnetized element supported in the bowl and extending into the stem to a point between the inlet and outlet for collecting metal particles contained in fluid passing through the stem, means for supporting the funnel shaped element in an upright position with the bowl at the higher elevation, means for introducing fluid to be tested into the stem through the inlet, and means connecting the outlet with the opening in the top wall of the cabinet and with the receptacle within the cabinet.

ARNOLD C. VOBACH.
MATTHEW FAIRLIE.